United States Patent Office 3,645,865
Patented Feb. 29, 1972

---

3,645,865
PRODUCTION OF SOLS
Terence Gordon Tripp, Chester, England, assignor to Monsanto Chemicals Limited, London, England
No Drawing. Filed Jan. 14, 1970, Ser. No. 2,954
Claims priority, application Great Britain, Jan. 22, 1969, 3,641/69
Int. Cl. B01k 1/00
U.S. Cl. 204—96                                                                 10 Claims

ABSTRACT OF THE DISCLOSURE

This invention involves a process for the production of a silica sol in which an electric current is passed through a liquid medium comprising a solution in a lower monohydric alcohol of a metal salt that is ionised to a sufficient extent and is present in sufficient amount to function as a supporting electrolyte using an anode comprising silicon in contact with the liquid medium with water being present in an amount of about 10% by weight based on the weight of the lower monohydric alcohol.

---

This invention relates to a process for the production of silica sols, more particularly to the production of silica sols in which the dispersion medium is alcoholic.

Our British patent specification No. 1,136,016 describes and claims a process for the production of a silica sol, in which an electric current is passed through a liquid medium comprising water and a monohydric alcohol having from one to three carbon atoms in the molecule, and containing sulphuric acid or hydrochloric acid as a supporting electrolyte, using an anode comprising silicon in contact with the liquid medium.

We have now found that some metal salts are further examples of suitable supporting electrolytes for use in the electrolytic preparation of silica sols.

Accordingly the process of the present invention is one for the production of a silica sol, in which an electric current is passed through a liquid medium comprising a solution in a lower monohydric alcohol of a metal salt that is ionised to a sufficient extent and is present in sufficient amount to function as a supporting electrolyte, using an anode comprising silicon in contact with the liquid medium, the said liquid medium containing water in an amount of up to 10% based on the weight of the lower monohydric alcohol.

The lower monohydric alcohols useful in the process include those having from 1 to 3 carbon atoms in the molecule, for example the alkanols methanol, ethanol, n-propanol and isopropanol and mixtures of these alkanols. Methanol and ethanol are the preferred alcohols.

The liquid medium contains not more than 10% of water based on the weight of the alcohol. Preferably, however, the amount of water present in the liquid medium at any given time is not more than 5% and even more preferably is not more than 2%, for example from 0.1 to 1%, of the weight of the alcohol. Water is consumed during the process, however, and to maintain a given concentration it may be necessary to add water as the electrolysis proceeds.

Suitable metal salts include metal chlorides and metal sulphates, for example cupric sulphate, nickel sulphate, magnesium sulphate, zinc chloride, zinc sulphate and ferric sulphate, of which the latter is the preferred salt for use in the present process. Hydrated or anhydrous salts can be used, but in many instances the former have higher solubilities in the lower monohydric alcohols and are therefore more suitable for obtaining liquid media having the required conductivities. The metal salt must have sufficient solubility and ionisation in the liquid medium to produce a solution which has sufficient conductivity to act as a current carrier. The amount of such a metal salt which needs to be dissolved in the liquid medium to give a practical conductivity obviously depends on a number of factors. However, a practical lower limit for the specific conductivity of the liquid at the operating temperature is about $2.4 \times 10^{-5}$ ohm$^{-1}$ cm.$^{-1}$. At lower conductivities, the process is unduly prolonged. Preferably the liquid medium has a specific conductivity of at least $3.0 \times 10^{-5}$, for example a conductivity within the range $10^{-4}$ to $10^{-3}$ ohm$^{-1}$ cm.$^{-1}$, such as for instance from $3 \times 10^{-4}$ to $5 \times 10^{-4}$ ohm$^{-1}$ cm.$^{-1}$.

In the case where the metal salt is ferric sulphate nonahydrate, satisfactory results are obtained using absolute ethanolic solutions having concentrations of from 4 to 8 grams of the salt per litre.

The anode employed may consist of substantially pure silicon, and various semiconductor grades of the material, i.e. silicon in which essentially the only impurity is a substance added in controlled amount to impart conductivity of a determined type and magnitude, can be used successfully. It is, however, impractical to use for the anode silicon having a resistivity significantly more than 10 ohm-cm. in the present process; silicon having a resistivity in the range 0.005 to 1.0 ohm-cm. is generally the most satisfactory.

For economic reasons, the anode employed in the process of the present invention is usually fabricated from a compound or alloy of silicon rather than from a semiconductor grade of the element. Ferrosilicons have been found to be especially suitable. The silicon content of the ferrosilicon can, for example, be within the range 60 to 99% or 70 to 99% by weight, and in typical instances may be within the ranges 70–80%, 90–95% or 97–99% by weight.

Any inert conductive material can serve as the cathode. Graphite is a useful cathodic material having a considerable advantage in terms of cost over other functionally suitable materials such as platinum or silver.

The electric current used in the process of the invention can be a simple direct or rectified A.C. with or without smoothing. Current densities of, for example, from 30 to 200 milliamperes per cm.$^{-2}$ can be used. For economic reasons, the excess voltage over the practical decomposition voltage should be kept as low as possible. In practice, the operating voltage is determined by factors such as cell design and electrolyte concentration, and wide variations are possible.

The electrolysis can be conducted at a range of temperatures. The generally most convenient manner of operating is to provide the electrolysis cell with a reflux condenser and to carry out the process at the boiling point of the liquid medium. This usually corresponds to the maximum solubility of the metal salt. Often the resistive heating by the current is sufficient to maintain the liquid medium at its boiling point. The process can be conducted at lower temperatures, however, for example from 10° C. up to the boiling point of the liquid medium provided that the metal salt is sufficiently soluble at the lower temperatures, but it is then generally necessary to provide cooling means.

It is usual but not essential to carry out the electrolysis in the presence of an inert atmosphere e.g. nitrogen. The passage of an inert gas through the apparatus is useful because it sweeps away the gaseous reaction products.

Preferably, the lower monohydric alcohol and the water are the only liquid components of the liquid medium, but an inert organic liquid miscible with the aqueous alcohol e.g. a ketone, an ether or an eseter can be present as a diluent if required. For example the presence of up to 25% of acetone based on the volume of the liquid medium can be tolerated. Where such as diluent is present, the basis for the water content of the medium, as discussed above, is the combined weight of the alcohol and diluent.

Alkyl silicate or alkyl polysilicates may be formed as by-products in the electrolysis particularly if the water content of the liquid medium is low. If the presence of these alkyl silicates is undesired, water may be added during the process or after the process has been completed to hydrolyse them to an alkanol and silica.

Sols having a range of silica concentrations, for example from 1% to 10% by weight of the sol, can be produced as the primary products of the process of the invention, depending on the amount of anode consumed in relation to the quantity of the liquid medium.

The colloidal dispersions of silica produced by the process of the invention are not stable and both the anion and the cation have to be removed to produce a stable sol. This can be done using conventional means to remove the cations and anions such as for example, ion exchange resins, Such deionised stable sols can be concentrated to sols or gels containing up to 40% by weight or more of silica by evaporation of the solvent. The concentrated sols are more stable when they contain a small amount of acid, and preferably sufficient acid is added to the deionised sol before concentration to give an acid concentration of from 0.005 to 0.15 gram equivalents of acid per litre of sol. The stabilising acid is preferably one that is fully dissociated in water or has a dissociation constant greater than $10^{-1}$ in water at 25° C. Sulphuric acid is the acid usually employed.

The invention is illustrated by the following examples.

EXAMPLE 1

A mixture of ferric sulphate nonahydrate (2 g.) and absolute ethyl alcohol (500 ml.) was heated to reflux in an atmosphere of nitrogen in a 700 ml. flask fitted with a graphite cathode and a ferrosilicon anode. More ferric sulphate nonanhydrate (3 g.) was added, some of which remained undissolved at the bottom of the flask. A D.C. potential of 70 volts was applied across the electrodes until the current through the cell increased to 2 amps. and the current was kept at this value for 27 amp.-hours by varying the potential between 55 volts and 107 volts. There was formed on the cathode a deposit some of which fell to the bottom of the flask. When the current was switched off, the silicon anode had lost 7.5 g. in weight and the graphite cathode had gained approximately 2 g. A sol was formed containing 12.5 g. of silica at a concentration of 3.7% of silica by weight of the ethanolic medium. The current yield for the reaction was 0.46 g. silica per amp. hour, compared with a current yield of 0.52–0.6 g. per amp. when using sulphuric acid in ethanol as the liquid medium.

The entire process was conducted in an atmosphere of nitrogen and apart from the initial heating of the solution to its boiling point, resistive heating by the electric current was sufficient to maintain the liquid medium at this temperature throughout the electrolysis.

During the electrolysis diethyl ether, sulphur and hydrogen sulphide were detected in the gas leaving the flask. The deposit on the cathode contained iron and a large proportion of a substance soluble in hot water, probably consisting mainly of ferrous sulphate.

The practical decomposition voltage of the liquid medium was found to be 5 volts. The specific conductivity of the liquid medium when reflux commenced was approximately $4 \times 10^{-4}$ ohm$^{-1}$ cm.$^{-1}$.

EXAMPLE 2

A solution of zinc chloride (10 g.) in absolute ethyl alcohol (100 ml.) was heated to reflux in a 250 ml. flask fitted with a ferrosilicon anode and platinum cathode. A D.C. supply was applied across the electrodes and gave a current of 0.6 amps. Water (1.0 ml.) was added dropwise during the first 4 hours of the electrolysis. After about 6 ampere hours, the current had dropped to 0.3 amps. and the current was then switched off. During the reaction a black deposit collected at the cathode and fell to the bottom of the flask. The anode lost approx. 0.8 g. in weight and a silica sol was formed containing 1.6 g. of silica at a concentration of 2.25% of silica by weight of the ethanolic medium. The current yield for the reaction was 0.26 gm. silica per amp. hour.

What is claimed is:
1. A process for the production of a silica sol, in which an electric current is passed through a liquid medium comprising a solution in a lower monohydric alcohol having from 1 to 3 carbon atoms in the molecule of a metal salt, selected from the group consisting of cupric sulfate, nickel sulfate, magnesium sulfate, zinc chloride, zinc sulfate and ferric sulfate that is ionised to a sufficient extent and is present in sufficient amount to function as a supporting electrolyte, using an anode comprising silicon in contact with the liquid medium, the said liquid medium containing water in an amount of up to 10% based on the weight of the lower monohydric alcohol.

2. A process according to claim 1 wherein the metal salt is selected from the group consisting of ferric sulfate and zinc chloride.

3. A process according to claim 2 in which the lower monohydric alcohol is ethanol.

4. A process according to claim 3 in which the liquid medium is a solution having a specific conductivity of at least $3.0 \times 10^{-5}$ ohm$^{-1}$ cm.$^{-1}$ at the operating temperature.

5. A process according to claim 4 in which the liquid medium has a specific conductivity within the range $3.0 \times 10^{-4}$ to $3.0 \times 10^{-3}$ ohm$^{-1}$ cm.$^{-1}$.

6. A process according to claim 4 in which the liquid medium contains not more thatn 2% of water based on the weight of the alcohol.

7. A process according to claim 6 in which the liquid medium contains from 0.1 to 1% of water based on the weight of the alcohol.

8. A process according to claim 7 in which the anode is a ferrosilicon containing from 60 to 99% by weight of silicon.

9. A silica sol that has been obtained by a process according to claim 1.

10. A silica sol that has been obtained by a process according to claim 2.

References Cited

FOREIGN PATENTS 1,136,016  12/1968  Great Britain.

JOHN D. WELSH, Primary Examiner

U.S. Cl. X.R.

204—101, 103; 252—309, 313